June 27, 1939.  M. J-B. BARBAROU  2,163,929
CONTROL OF THE SLEEVE VALVES OF ENGINES
Filed July 8, 1937
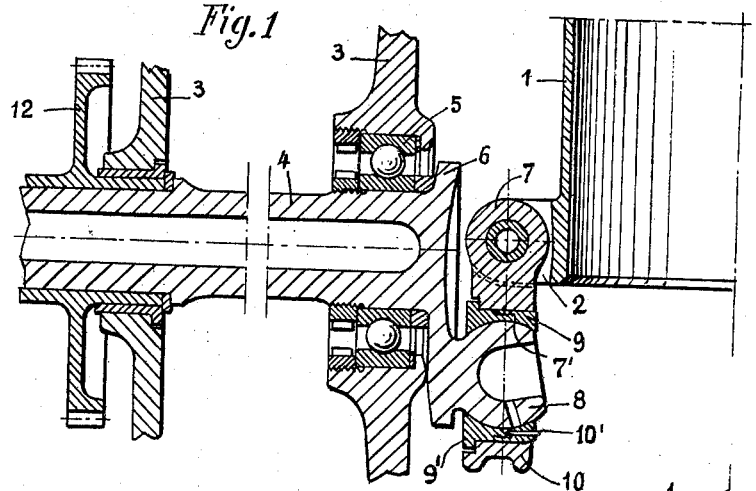
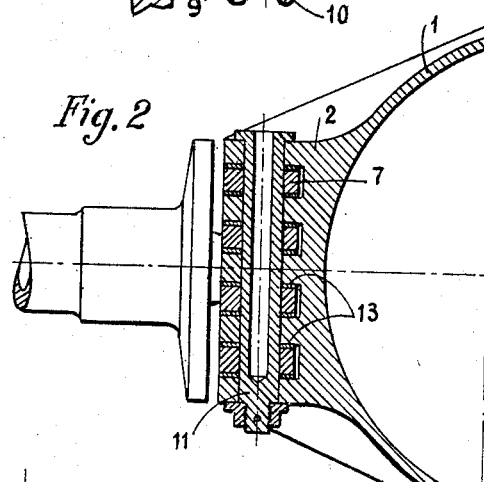
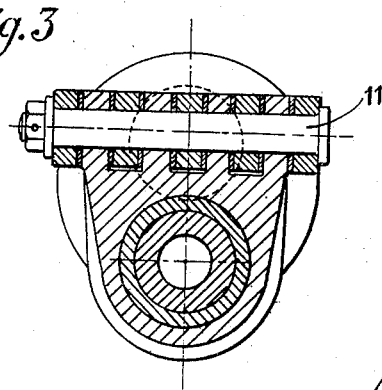
Marius J. B. Barbarou, Inventor
By Raymond A. Robb, Attorney Patented June 27, 1939

2,163,929

UNITED STATES PATENT OFFICE 2,163,929

CONTROL OF THE SLEEVE VALVES OF ENGINES

Marius Jean-Baptiste Barbarou, Neuilly-sur-Seine, France

Application July 8, 1937, Serial No. 152,592
In France July 10, 1936

2 Claims. (Cl. 123—81)

The present invention relates to the distribution sleeve of sleeve valve motors and more particularly the control of said motors sleeves.

To replace the usual valves of internal combustion engines it has already been proposed to use cylindrical sleeves with ports uncovering with each cycle the admission and exhaust pipes. In the known methods of mounting, the sleeve has imparted to it a double movement of reciprocation or translation and of oscillation in such manner that a point of the said sleeve describes a curve of an oval character. The control of the sleeve movement must be able to give the necessary freedom in order to permit the positive drive of the distributing member in spite of its travel away in the course of rotation. In general there has been used a control by eccentric and ball joint or connecting rod with sliding axis for the transmission of the forces.

An object of this invention is to provide the movement of a cylindrical sleeve by means of a crank shaft giving the reciprocation and oscillation desired; the connection between the said shaft and the sleeve being effected by an oscillating lever forming a hinge fixed to the shaft by a ball joint, in known manner, and on to the sleeve so that oscillation is possible on the longitudinal plane of the cylinder but without any freedom in the plane of oscillation of the sleeve.

With the foregoing and other objects in view, the invention resides in the combination of parts and in the details of construction hereinafter set forth in the following specification and appended claims, certain embodiments being illustrated in the accompanying drawing, in which:

Fig. 1 is a section through the longitudinal axis of a sleeve and its control.

Fig. 2 is a section of the sleeve control showing the mounting of the hinge.

Fig. 3 is a section of the hinge on the line AB of Fig. 2.

Briefly, a cylindrical slide valve 1 is provided at its base with lugs 2 of suitable number and dimensions. Perpendicularly to the lugs is placed a spindle 11 on which is mounted the multiple element hinge 7. This hinge can therefore oscillate about the axis 11. A control shaft 4 supported for example by means of a ball bearing 5 in a casing 3 comprises a plate 6 with a ball socket 8, the distance apart of which with respect to the axis of the shaft corresponds to the course of reciprocation and oscillation of the sleeve 1. The ball joint 8 is mounted in the hinge by a split spherical friction ring 9. This split ring comprises two portions 9—9' threadedly connected together at the joint 7'. A pin 10' is used to prevent relative movement between the portions 9—9'.

The control shaft receives its movement through a pinion 12. There will be preferably arranged between the lugs 2 of the sleeve and the elements 7 of the hinge, washers 13 in bronze to diminish the friction together of these two parts. In the example, the sleeve 1 oscillates by about 20° about its mean position as represented on Fig. 2. The hinge therefore takes up, retained by the ball joint 8 which remains always in its plane of rotation, the corresponding inclination.

There is thus obtained a positive simple and light control which is however very strong, and suppress all the movements of reciprocation which are replaced in the case of this invention by movements of oscillation which are more mechanical and less subject to wear.

I claim:

1. In an internal combustion engine having a sleeve valve and crankshaft for actuating the same, connecting means between the valve and crankshaft comprising a lever hinged to the valve, a crank extension on the crank shaft, and a ball and socket connection between the lever and crank extension, the lever being so hinged to the sleeve valve that oscillation is possible in the longitudinal plane of the sleeve valve only.

2. In combination the connecting means for the sleeve of a sleeve valve engine, comprising a lever hinged to the sleeve, a split socket at the free end of said lever, and a ball secured to a crank fitted in said socket, whereby the sleeve may be imparted a reciprocatory and oscillatory movement, upon rotation of the crank.

MARIUS JEAN-BAPTISTE BARBAROU.